R. G. MACPHERSON.
MACHINE FOR PLUCKING THE FEATHERS OF BIRDS.
APPLICATION FILED SEPT. 26, 1916.

1,231,401.

Patented June 26, 1917.
4 SHEETS—SHEET 1.

R. G. MACPHERSON.
MACHINE FOR PLUCKING THE FEATHERS OF BIRDS.
APPLICATION FILED SEPT. 26, 1916.

1,231,401.

Patented June 26, 1917.
4 SHEETS—SHEET 4.

FIG. 4.

FIG. 5.

Reginald G. Macpherson
By Wm. Eus Lamb Cothy

UNITED STATES PATENT OFFICE.

REGINALD GEORGE MACPHERSON, OF LEEDS, ENGLAND.

MACHINE FOR PLUCKING THE FEATHERS OF BIRDS.

1,231,401.

Specification of Letters Patent. Patented June 26, 1917.

Application filed September 26, 1916. Serial No. 122,237.

*To all whom it may concern:*

Be it known that I, REGINALD GEORGE MACPHERSON, railway officer, a subject of the King of Great Britain, residing at 21 Airlie avenue, Leeds, in the county of York, England, have invented certain new and useful Improvements in a Machine for Plucking the Feathers of Birds, and of which the following is a specification.

The object of this invention is to provide a machine for plucking the feathers of birds, such as poultry, by which machine the feathers can be removed quickly and efficiently and hand labor thereby obviated or economized.

The machine according to this invention comprises a tray, open at the base and having preferably inclined sides, into which tray the birds to be plucked are placed, the opening at the base of the tray being of such width that the bodies of the birds cannot pass through, while means are preferably provided whereby the bodies of the birds in the tray are intermittently changed in position in relation to the base opening. Means are also provided by which the tray is given longitudinal reciprocating motions.

Beneath the reciprocating tray is located a mechanically-operated plucking device comprising an open-ended tubular member, pivoted to which is a gripping jaw, its acting gripping edge being opposed to the gripping edge of the wall of the tubular member, the lower end of the tubular member being flexibly connected with an air suction device. Mechanical means are provided whereby the plucking device with its jaw open is carried up to the body of the bird, the feathers are drawn into the plucking device by the suction of the air, the gripping jaw then closing upon the feathers, and plucking the same from the body, as the plucking device descends, so that upon the jaw again opening the feathers so plucked are sucked down the tubular member, and the plucking device again ascends to grip the next feathers which have been brought above it by the travel of the tray, and so on.

Figure 1:
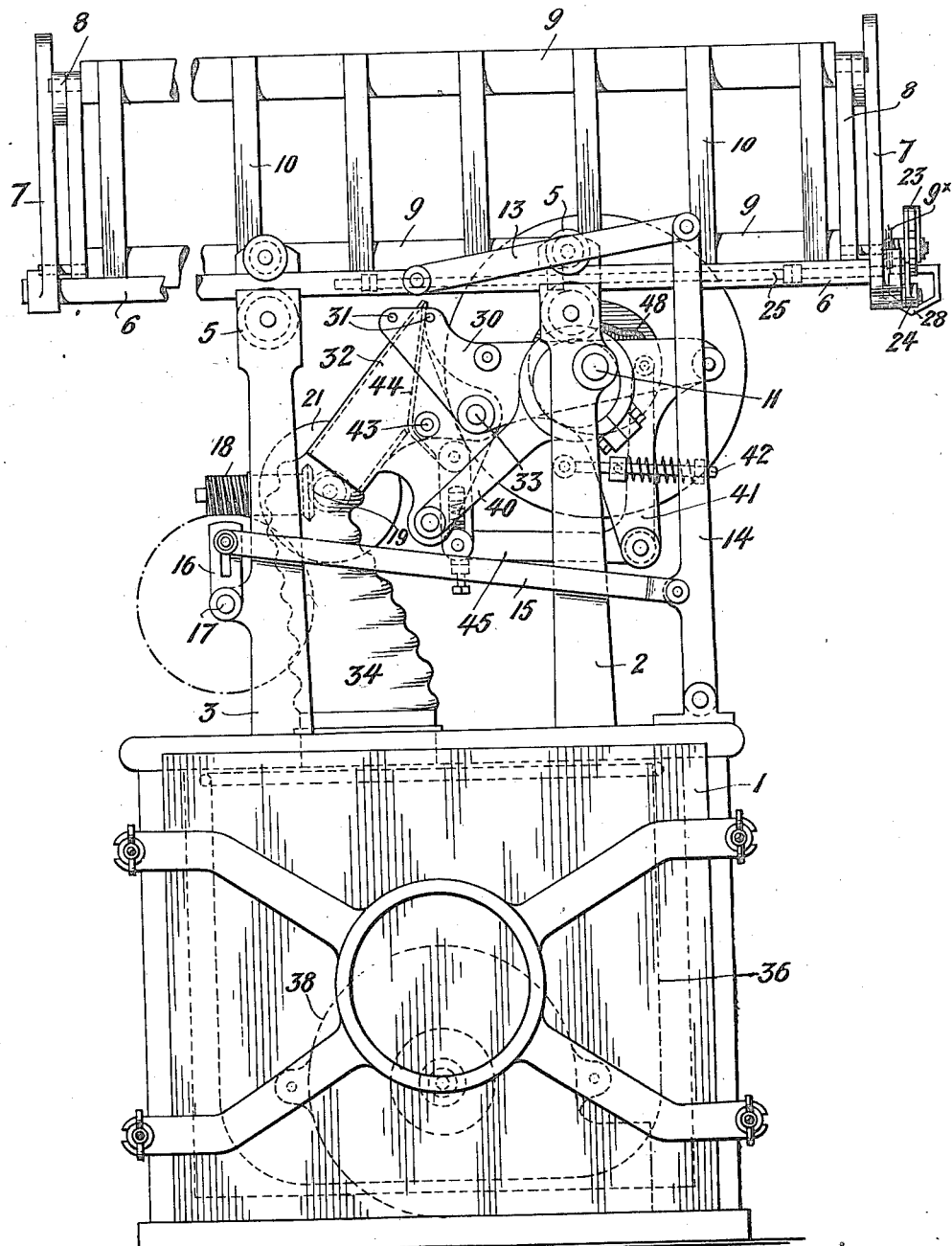

The invention will be described with reference to the accompanying drawings, whereon Figure 1 is a side elevation, Fig. 2 a right-hand end view of Fig. 1, and Fig. 3 a plan view with the tray removed. Fig. 4 is a sectional elevation corresponding to Fig. 1, to better illustrate the plucking device, and Fig. 5 is an elevation of a tappet rod detached.

Mounted upon the top of a base box 1, hereafter referred to, are fixed two pairs of standards 2 and 3, and also mounted upon said box 1 is a fifth standard 4.

Each of the standards 2 and 3 carries at its upper end two grooved wheels 5 one above the other, and between these wheels parallel side rods 6, forming the longitudinal members at the base of a tray for carrying the bodies of the birds, are free to travel, said tray consisting of said rods 6 connected at their ends by upstanding end frames 7. The end frames 7 in conjunction with links 8 support two pairs of parallel longitudinal revoluble rollers 9 which extend from one end frame to the other, and endless bands 10, located at distances apart, extend around the pair of rollers 9 on one side of the tray, and other similar bands 10 extend around the pair of rollers 9 on the other side of the tray. The parallel lower rollers 9 at the base of the tray are at such a distance apart that the bodies of the birds placed in the tray so formed will not pass through between such lower rollers, while the upper rollers 9 are at a greater distance apart so that the tray consists of a kind of cradle with an open base to receive the bodies of the birds.

A main driving shaft 11 driven through pulleys 12 from any source of power extends transversely of the machine and is carried by bearings in the standards 2 and 4.

Figure 3:
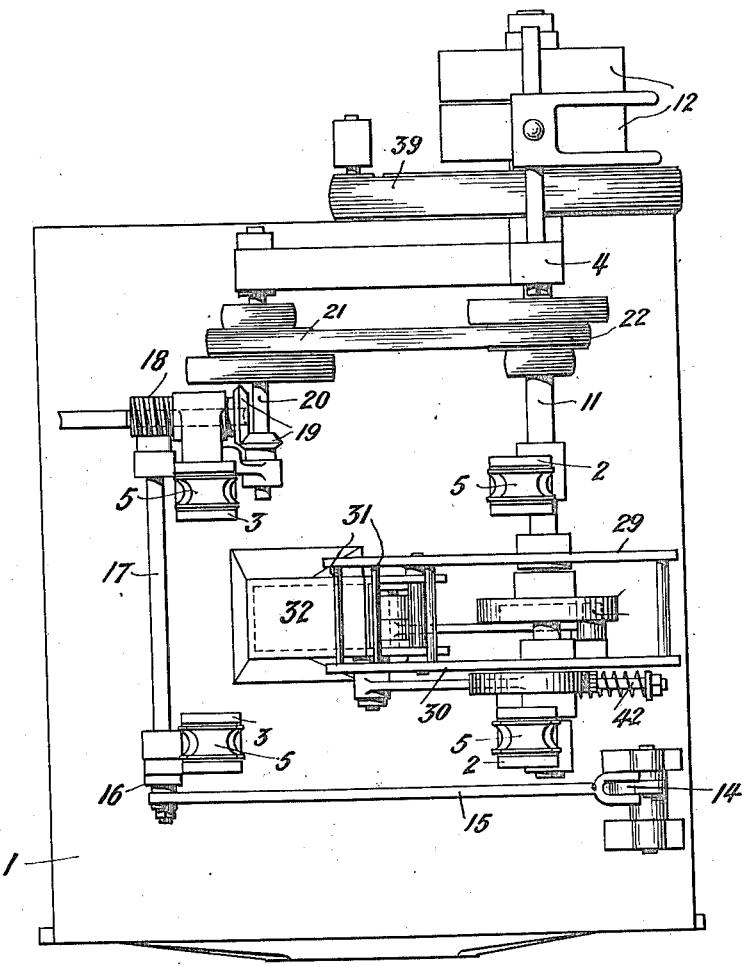

In order to cause the tray to travel backward and forward it is connected by a link 13, Fig. 1, to the upper end of an arm 14 pivoted on the base box 1, and a connecting rod 15 extends from the arm 14 to a crank 16 on a shaft 17 carried in bearings from the standards 3; the shaft 17 is driven by worm gearing 18 through bevel gearing 19 by means of a shaft 20, Fig. 3, the shaft 20 being driven by a belt connection connecting pulleys 21 on the shaft 20 with pulleys 22 on the main shaft 11.

The bodies of the birds in the tray are supported on the endless bands 10 with their lower portions protruding downwardly between the lower rollers 9 of the tray, and in order to change the position of the bodies of the birds at the termination of the travel of the tray in one direction, the rollers 9 receive the necessary angular motion by means of a tappet action. To this end, as shown at Fig. 2, the two lower rollers 9 are connected by means of sprocket wheels and an endless chain 9×, and on one end of one of these rollers is a ratchet gear 23 operated by a two-armed lever 24 pivoted on the end frame 7 of the tray, one arm of said lever being connected by a link to the ratchet gear 23, while the other arm is operated at the end of the travel of the tray by a tappet rod 25, shown by dotted lines at Fig. 1, and more clearly illustrated by the detached detail view at Fig. 5. The rod 25 is carried so as to be free to slide endwise from brackets projecting from the bar 6 of the cradle, as shown at Fig. 2, and extends through a lug 26 Fig. 5 on one of the standards 2, and stop pieces 27 are fixed on the rod to contact with the fixed lug 26. The rod 25 has a head 28 formed with opposite inclines, which inclines co-act with the lower arm of the lever 24. By these means, when the tray arrives at either end of its travel, the endless bands 10 will receive motion and change the position of the birds in the tray.

Beneath the tray and loosely mounted on the main shaft 11 is a frame, consisting of two side members 29 and 30 connected together by cross stays, and also having two cross bars 31, Fig. 4, extending between them. In between the side members 29 and 30 is pivoted the plucking device comprising an open-ended tubular member 32 having side extensions pivoted at 33, Fig. 4, between the side members 29 and 30, and the lower end of the tubular member 32 is connected by a flexible tube 34 to an opening 35 in the top of the box 1. The opening 35 communicates with the open top of a bag 36, Fig. 2, through the material of which air can pass, and the box is formed with an opening 37 communicating with a suction fan 38 fixed to the side of the box and driven by any convenient means, such as a belt 39 from the main shaft 11.

The tubular member 32 has a downward extension, indicated at Fig. 1, to which is pivoted the end of an eccentric rod 40, the eccentric being fixed on the main shaft 11, and by which means the tubular member 32 receives rocking motions about its pivot 33 so that the upper end of the tubular member 32 is caused to rise and fall intermittently between the cross bars 31.

In order to support the frame composed of the side members 29 and 30 and which carries the tubular member 32 just described, the side member 30, shown at Fig. 1, has a downward extension 41 from which a lateral lug extends, through which lug a bolt 42, Fig. 1, freely passes and bears against a spring carried by said bolt, the latter bolt 42 being pivoted to one of the standards 2, so that the frame can rock about the axis of the main shaft 11 against the action of the spring on the bolt 42, and thereby the frame is self-adjusting in height to suit the birds carried in the tray. That is to say, the bodies of the birds in the tray extend downward between the lower rollers 9 of the tray and bear upon the cross bars 31 of the frame, and owing to the frame being resiliently held in position by the spring on the bolt 42, the cross bars 31 can adjust themselves to the body of the bird.

Pivoted at 43 between the sides of the tubular member 32 is a jaw 44, clearly shown at Fig. 4, and when closed with its upper gripping end in contact with the upper edge of the tubular member 32, as shown at Fig. 4, it closes the mouth of the said tubular member. This jaw 44 is operated at proper times by a bell crank lever 45, Fig. 1, fulcrumed on the downward extension 41 of the side member 30; one arm of the lever 45 is pivoted to a link 46, Fig. 4, which latter is pivoted to a downwardly extending part of the jaw 44, and the other arm of the bell crank lever 45 extends upward and carries a bowl or runner 47 which engages a grooved cam 48, Fig. 4, fixed on the main shaft 11, whereby the jaw 44 is opened and closed relatively to the upper edge of the tubular member 32 to grip and release the feathers at proper times.

The machine operates as follows:—

The body or bodies of the birds to be plucked are placed in the tray when it is at one end of its travel, so that the body of a bird so placed will be supported against any downward pull by the two lower rollers 9 of the tray, while the lower part of the body of the bird may slightly protrude below the axes of the lower rollers 9.

The main shaft 11 being driven through the medium of the pulley 12, the tray carrying the birds will be traversed at the requisite speed, and as the body of a bird passes over the cross bars 31, Fig. 1, of the frame comprising the side members 29 and 30, the plucking device will be advanced upward between the cross bars 31 with its jaw 44 open, and the suction produced by the fan 38 will draw the feathers of the bird into the open mouth of the plucking device, the plucking device being so advanced upward and its jaw opened, by the operation of the connecting rod 40 of the eccentric, Fig. 1, and by the operation of the cam 48 rocking the bell crank lever 45.

The feathers having been so drawn in by the suction of air between the open mouth of the plucking device and the jaw 44, the said jaw 44 is closed on to the upper edge of the tubular member 32, and the feathers so seized are plucked from the bird by the following descent of the plucking device, and upon such descent taking place the jaw 44 is opened and the feathers so plucked are drawn by the suction device into the bag 36, and these operations of the plucking device are repeated as the body of the bird is traversed by the tray over the plucking device.

Figure 2:
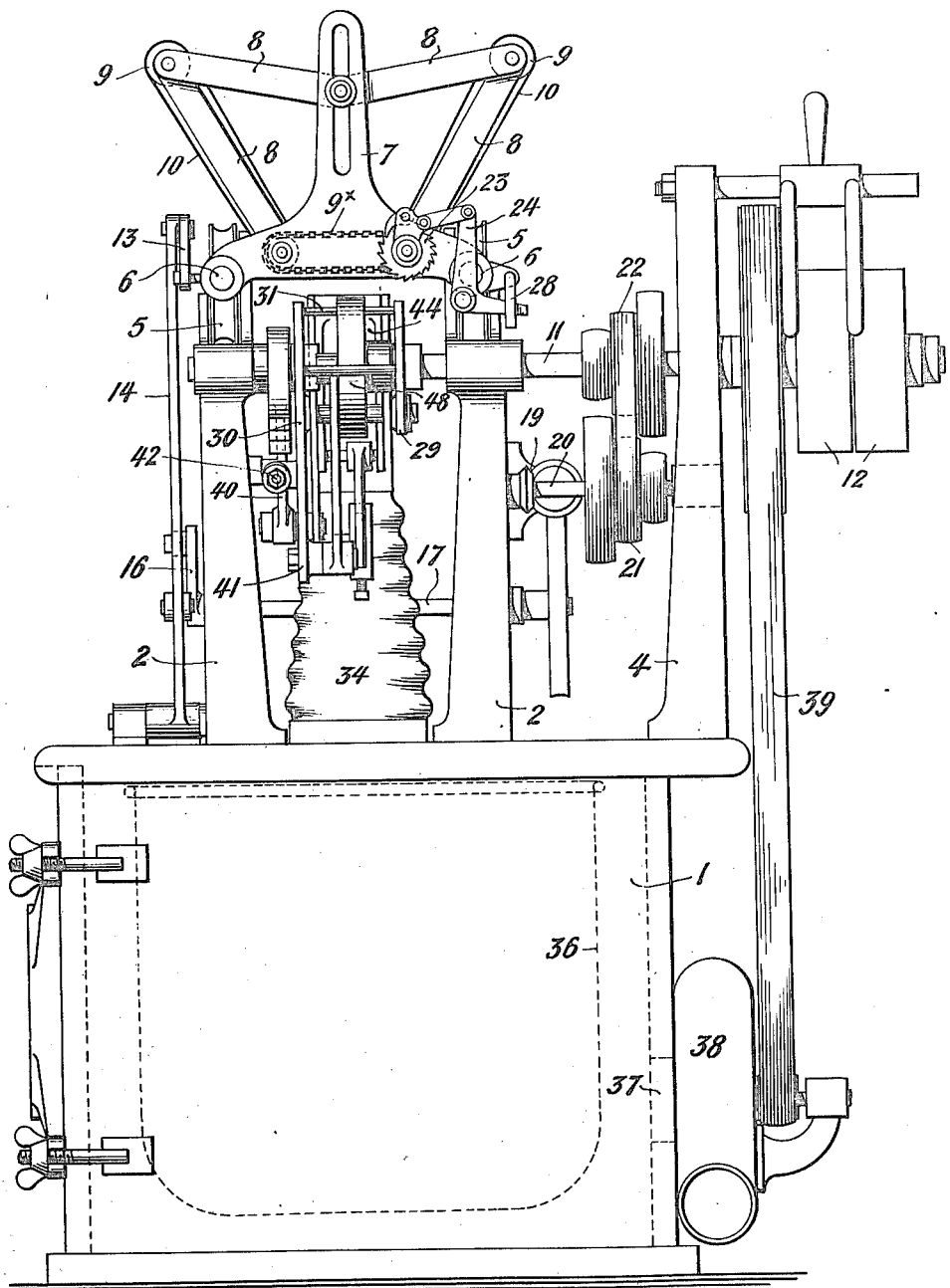

Upon the tray reaching the end of its travel, one of the stop pieces on the tappet rod 25, Fig. 5, contacts with the fixed lug 26 on the standard 2, and the rod is moved endwise relatively to the tray, and consequently the lever 24, Fig. 2, is rocked, and the ratchet mechanism 23 operated, so that all the endless bands 10, forming the sides of the tray and against which the bodies of the birds lie, receive a limited motion, the inner lengths of the bands on one side of the tray moving in a downward direction, and the inner lengths of the bands on the other side of the tray moving in an upward direction; thereby the bodies of the birds are adjusted in a rotary manner through a portion of a revolution, bringing an unplucked part of the bodies into the region of action of the plucking device.

The tray is then traversed upon the grooved wheels 5 in the reverse direction by the crank 16, Fig. 1, connecting rod 15, upstanding arm 14, and link 13, and the plucking of the birds proceeds as previously described, as each bird passes over the plucking device particularly described at Fig. 4, and at the end of the travel of the tray the endless bands 10 again receive motion through the tappet rod, 25, Fig. 5, and another portion of the bodies of the birds is brought into position to be operated upon by the plucking device during the next traverse of the tray. In this manner the position of the birds is automatically changed at the end of each travel of the tray until the entire surfaces of the bodies of the birds have been brought under the action of the suction brought about by the fan 38 and under the action of the plucking device, and by which the whole of the feathers are plucked.

What I claim as my invention and desire to secure by Letters Patent is:—

1. In a machine for plucking the feathers from birds, the combination with suitable framework and operating mechanism, a tray carried by said framework having an open base to expose parts of the bodies of birds placed therein, means for automatically traversing said tray backward and forward on said framework and for changing the position of the birds in said tray, a plucking device adapted to pluck the feathers of the birds exposed through the open base of said tray and means for removing and securing the feathers so plucked.

2. In a machine for plucking the feathers from birds, the combination of a framework, a tray carried by said framework said tray having inclined sides and an open base, revoluble rollers located at the sides of said tray, endless bands passing over said rollers against which bands the bodies of the birds rest, means for traversing said tray backward and forward on said framework and giving motion to said bands at the end of each traverse of said tray to change the position of the birds in said tray, a plucking device adapted to pluck the feathers from the various portions of the birds as automatically exposed thereto through the base of said tray and means for carrying away and securing the feathers so plucked.

3. In a machine for plucking the feathers from birds, the combination with suitable framework and operating mechanism, a tray adapted to automatically expose different portions of the birds therein to plucking, a plucking device comprising a pivoted tubular part, gripping members within said tubular part, means for automatically rocking said tubular part to and away from the exposed portions of the birds, means for automatically opening said gripping members upon approaching the birds closing said gripping members when nearest the birds and for reopening same after withdrawal from the birds, together with pneumatic means for drawing the feathers into said tubular part between the said gripping members and for carrying away the plucked feathers.

4. In a machine for plucking the feathers from birds, the combination of means for supporting the birds, a plucking device comprising a tubular member open at its upper end, means for pivotally supporting said tubular member, a gripping jaw pivoted to said tubular member adapted to coact with an upper edge thereof, an air suction device adapted to draw the feathers to be plucked into the open mouth of said tubular member, means for communicating a rocking motion to said tubular member adapted to bring the mouth of same to and away from the bodies of the birds, means for automatically opening and closing said gripping parts by means of said pivoted gripping jaw at proper times, to permit the feathers sucked into said tubular part between said gripping parts to be seized thereby, held during the withdrawal thereof and subsequently released, together with suitable means for removing and securing the plucked feathers.

5. A machine for plucking the feathers of birds; comprising in combination a framework, a tray carried by said framework, said tray having an open base to expose the lower part of the bodies of the birds placed therein, means for traversing said tray backward and forward on said framework, a plucking device carried by said framework and located beneath the open base of said tray, said plucking device comprising two opposed pivoted gripping members, means for rocking said gripping members upward and opening same to receive the feathers to be plucked, for closing said gripping members to grip said feathers and for lowering said gripping members to pluck said feathers, and an air suction fan to suck air through said gripping members to draw the feathers to be plucked into the grip of same and when plucked to carry away said feathers.

6. In a machine for plucking the feathers of birds; the combination of a framework, a tray carried by said framework said tray having an open base to expose the lower part of the bodies of the birds placed therein, means for traversing said tray backward and forward on said framework, a plucking device located beneath the open base of said tray, said plucking device comprising a tubular member open at its upper end, means for pivotally carrying said tubular member from said framework, a gripping jaw pivoted to said tubular member and adapted to coact with the upper edge thereof to grip and release the feathers, an air suction device, a flexible tubular extension connecting the lower end of said tubular member with said suction device to draw the feathers to be plucked into the mouth of said tubular member and when plucked to carry same down said tubular member, a receptacle to receive the plucked feathers, means for communicating rising and falling movements to said tubular member to bring the mouth of same to and away from the bodies of the birds, means for opening and closing the gripping jaw at proper times to permit the feathers sucked within the mouth of said jaw and said tubular member to be seized and held during the plucking operation and subsequently released.

7. In a machine for plucking the feathers of birds; the combination of a framework, a tray carried by said framework, means for traversing said tray backward and forward on said framework, said tray having inclined sides to support the bodies of the birds placed therein and an open base to expose the lower parts of said bodies of said birds, revoluble rollers located at the sides of said tray, endless bands passing over said rollers and against which bands the bodies of the birds rest, means for giving motion to said bands at the termination of each traverse of said tray to change the positions of said birds in said tray, a plucking device carried by said framework and located beneath the open base of said tray, said plucking device comprising two opposed pivoted gripping members, means for rocking said gripping members upward and opening same to receive the feathers to be plucked, for closing said gripping members to grip said feathers and for lowering said gripping members to pluck said feathers, and an air suction fan to suck air through said gripping members to draw the feathers to be plucked into the grip of same and when plucked and released by said gripping members to carry away said feathers.

In witness whereof I have hereunto set my hand in the presence of two witnesses.

REGINALD GEORGE MACPHERSON.

Witnesses:
 JOHN JOWETT,
 CYRIL BELLAMY,